United States Patent
Inaba

[19]

[11] Patent Number: 6,139,736
[45] Date of Patent: Oct. 31, 2000

[54] DEVICE FOR MAGNETICALLY AGGLOMERATING AND TREATING IMPURITIES IN LIQUID

[76] Inventor: Mitsuru Inaba, 937-112, Tokiwa, Kamakura, Kanagawa-ken 248, Japan

[21] Appl. No.: 09/142,764

[22] PCT Filed: Mar. 13, 1997

[86] PCT No.: PCT/JP97/00797

§ 371 Date: Oct. 6, 1998

§ 102(e) Date: Oct. 6, 1998

[87] PCT Pub. No.: WO97/33696

PCT Pub. Date: Sep. 18, 1997

[30] Foreign Application Priority Data

Mar. 14, 1996 [JP] Japan ................................ 8-084550

[51] Int. Cl.$^7$ .................................................. B01D 35/06
[52] U.S. Cl. .......................................... 210/222; 209/232
[58] Field of Search .................................. 210/222, 695; 209/217, 219, 220, 222, 232

[56] References Cited

FOREIGN PATENT DOCUMENTS 53-0008875  1/1978  Japan .
53-091460   8/1978  Japan .
61-005780B2 2/1986  Japan .
6-071195    3/1994  Japan .

*Primary Examiner*—W. L. Walker
*Assistant Examiner*—Marianne Ocampo
*Attorney, Agent, or Firm*—Young & Thompson

[57] ABSTRACT

A U-shaped side of a yoke is mounted on the confronting sides of two rotating plates attached to the inside of a magnetically agglomerating and treating tank, and a plurality of magnets, each having a magnetic force of not less than 12,000 gausses, are mounted on the confronting sides of the yoke, respectively, and the gap between the faces of the confronting magnets is set at 300 mm to form a magnetic field. Liquid containing impurities, such as magnetic and non-magnetic suspensions is caused to flow into this magnetic field for contact with the magnets for a predetermined period of time, so that the non-magnetic suspension is magnetically agglomerated together with the magnetic suspension, so as to be attracted to the magnets, and the magnetically agglomerated matter adhering to the surfaces of the magnets is separated.

7 Claims, 2 Drawing Sheets

DEVICE FOR MAGNETICALLY AGGLOMERATING AND TREATING IMPURITIES IN LIQUID

TECHNICAL FIELD

This invention relates to a device for magnetically agglomerating and treating impurities in liquids so as to magnetically agglomerate and treat the impurities such as magnetic suspensions and non-magnetic suspensions in the liquids, thereby to magnetically adsorb them on magnets, for example, relates to a device for removing from processing liquids, impurities of magnetic suspensions such as cuttings and metal powders, and non-magnetic suspensions such as carbon and soil matters, which are contained in oily or aqueous processing liquids used for electrical discharge machining by an electrical discharge machine or for cutting work or grinding work to cast articles by machine tools.

PRIOR ART

Hitherto, fine impurities such as suspensions (colloidal substances) contained in liquids have been removed by a filter using a filter paper or filter cloth or by a pre-coat filter coated with a filtration auxiliary. These fine impurities such as suspensions are, however, immediately adhered to the filter and accumulated thereon to increase a flow resistance of the filter, for which reason removal of the impurities by the filters are often made impossible within a short time.

Therefore, there were disadvantages that removal process of fine impurities such as suspensions by means of a filter or a pre-coat filter has to be discontinued to exchange the filter paper or filter cloth, or to pre-coat the filter with the filter auxiliary every times.

According to circumstances, fine impurities such as suspensions may be removed by using a screen or a strainer. In this case, however, clogging with the fine impurities appears soon to increase the flow resistance, thereby making removal process of the impurities impossible in a short time, for which reason it is necessary to discontinue the removal process of the fine impurities for cleaning the screen or strainer every time.

As mentioned above, in the conventional impurity removing process, in order to remove the fine impurities such as suspensions in the liquids, it is necessary to discontinue the removal process frequently, for which reason there are disadvantages in not only inefficiency of the process but also complicated, time-consuming and inconvenient operations such as exchange of the filter paper or cloth, pre-coating with the filtration auxiliary and cleaning the screen or punching metals. Particularly, upon disassembling the filter (apparatus), many problems are raised not only in long term discontinuation of the impurity removing process but also in increasing initial and ruing costs of the impurity removing system.

In addition to the above-mentioned filtration apparatuses, magnets such as ferrite have also been used to magnetically adsorb and remove fine impurities such as suspensions in liquids. Since, however, magnets such as ferrite are used, which have a magnetic force of 1200 to 4000 gausses. The impurities removed in liquids by such magnets would be only the magnetic suspensions such as iron or nickel, but non-magnetic suspensions such as carbon or oils are almost unremovable and retained in the treated liquids.

The residual non-magnetic suspensions such as carbon and oils in the treated liquids cause problems in pollution and corruption likely to generate malodor and off-flavor, thereby deterioration of the work environments.

If the liquids containing such non-magnetic suspensions are discharged to sewage or rivers without proper treatments, then problems with environmental pollution are caused, for which reason it is necessary to separately provide waste-liquid treating systems, thereby increasing plant and equipment investments.

For disposal as industrial waste in open-spaces near the factory, it is necessary to keep a vast disposal space due to a large amount of the waste. Relying upon disposal trader raises another problem with increase in the cost for disposal.

If a treating object is a used electrical discharge working liquid or a coolant liquid, then the magnetic suspensions and non-magnetic suspensions are included as impurities, for which reason effective ingredients for the machining liquid or coolant liquid are also included therein. The removal of these impurities makes the liquid available again as an electrical discharge machining liquid or the coolant liquid. Notwithstanding, no recycle of resources was made.

The present inventor has conducted intensive researches on magnetic adsorption of fine impurities such as suspensions by using magnets in order to solve the above-mentioned problems with the prior art, and could develop a method and an apparatus for magnetically agglomerating and treating impurities in liquids to remove the impurities from the liquids as mentioned in Japanese Laid-open Patent Publication No. 6-71195.

Namely, in accordance with this developed impurity removing method, a liquid including impurities such as magnetic suspensions or non-magnetic suspensions is flowed onto a magnet having a magnetic force of not less than 4000 gausses (preferably not less than 12000 gausses) at a flow rate of not less than 0.01 m/sec, for example, 0.01 to 0.1 m/sec, so that the impurity containing liquid is made into contact with the magnet for not more than 180 minutes, preferably not more than 60 minutes, for example 0.05 to 60 minutes, thereby causing a magnetic agglomeration of the non-magnetic suspensions in cooperation with the magnetic suspensions in the liquid as core particles, resulting in magnetic adsorption on the magnets for removal thereof.

For the impurity removing system, rotary plates are fixed to opposite ends of a rotary shaft provided in a magnetically agglomerating and treating tank, and a plurality of magnets having a magnetic force of not less than 4000 gausses (preferably not less than 12000 gausses) are attached at a predetermined interval onto entire regions of confronting sides of the two rotary plates. In this case, the plural magnets are so arranged as to make magnetic pole pairs, so that the plural magnets on the one rotary plate form magnetic pole orders of N, N, S, S, N, N, S, S, whilst the plural magnets on the other rotary plate form magnetic pole orders of S, S, N, N, S, S, N, N, thereby causing the magnetic agglomeration of the non-magnetic suspensions in cooperation with the magnetic suspensions as core particles to form a magnetic field for magnetic adsorption onto the magnets, whereby the magnetic agglomerates adsorbed on the surfaces of the magnets are peeled by scrapers which are provided adjacent to the surfaces of the magnets fixed on the two rotary plates in order to remove the impurities in the liquids.

During the continuous investigation of the impurity removal technique in the liquids mentioned in Japanese Laid-open Patent Publication No. 6-71195, the following facts were found. If the magnetic force of the magnets, the flow rate of the liquid, the time of contact of the liquids with the magnets, and the magnetic pole arrangement of the magnets were set under the same conditions as mentioned above, then during the magnetic agglomerates of the impurities in the liquids, a part of the non-magnetic suspensions is agglomerated/mixed with the magnetic agglomerates and thus removed, whilst other part of the non-magnetic suspensions is not magnetically agglomerated nor agglomerated/mixer with the magnetic agglomerates, thereby remaining in the treated liquids, resulting in deterioration of the quality of the treated liquids.

Accordingly, it is an object of the present invention to provide a treating apparatus capable of magnetically agglomerating all the impurities such as magnetic suspensions and non-magnetic suspensions (colloids) included in liquids to completely remove the same from the liquids without discontinuation of the removal treatment of the impurities such as the magnetic suspensions and non-magnetic suspensions in the liquids.

It is another object of the present invention to provide a treating apparatus capable of reducing initial and running costs for impurity-removal process from a liquid without discontinuation of the removal process, and with nor exchange of filter papers or filter cloths nor cleaning strainers every times.

It is a further object of the present invention to remove impurities from waste liquors such as the used electrical discharge machining liquids and coolant liquids, which are hard to be treated and discharged and also which require costly disposal, and to recycle the electrical discharge machining liquids and coolant liquid as the treating liquids for effective use as resources.

It is a still further object of the present invention to separate impurities in the liquids and eliminate the liquid from the impurities for collections of the impurities, thereby to largely reduce the amount of the wastes, save the disposal space, curtail the disposal cost, and to prevent corruption of wastes and generation of odors for improvement of the work environments.

DISCLOSURE OF THE INVENTION

The apparatus for magnetically agglomerating and treating impurities in liquids according to the present invention is characterized in that magnets having a magnetic force of not less than 4000 gausses are attached at a predetermined interval on inside confronting faces of a U-shaped yoke and further rotary plates are fixed to opposite outside faces of the yoke;

the rotary plates are fixed to opposite ends of a rotary shaft provided in a magnetically agglomerating and treating tank which is communicated with a stock solution inlet pipe and a treated liquid outlet pipe;

a distance L between the confronting magnets is set in the range of 6–100 mm to form a magnetic field of a magnetic flux density of not less than 3000 gausses for flowing a liquid containing impurities such as magnetic suspensions and non-magnetic suspensions through the magnetic field at a flow rate of not less than 0.01 m/sec preferably in the range of 0.01–0.1 m/sec and concurrently making the liquid into contact with the magnets for not more than 60 minutes preferably in the range of 0.05–60 minutes, so as to release one of the paired electrons of the non-magnetic suspension in the liquid, thereby to produce unpaired electrons for magnetic agglomerating together with the magnetic suspensions;

adhesive plates are provided on the inside faces of the confronting magnets for magnetic adsorption by the magnets; and scrapers are provided for continuously scraping the magnetic agglomeration on the surfaces of the adhesive plates.

In the apparatus for magnetically agglomerating and treating impurities in liquids according to the invention, magnets having a magnetic force of not less than 12000 gausses are attached to increase an efficiency of removing the impurities.

Also in the apparatus for magnetically agglomerating and treating impurities in liquids according to the invention, the plural magnets arranged adjacent to each other and spaced; at the interval on the entire surface of the inside of the yoke attached to the side of the one rotary plate and the plural magnets arranged adjacent to each other and spaced at a predetermined interval on the entire surface of the side of the yoke attached to the side of another of the other rotary plate are so arranged to form magnetic pole pairs for forming a magnetic field having an interactively enhanced magnetically agglomerating and treating capacity thereby to further increase the efficiency of removing the impurities.

Also in the apparatus for magnetically agglomerating and treating impurities in liquids according to the invention, a plurality of the magnets arranged adjacent to each other and spaced at a predetermined interval onto the entire inside surface inside of the yoke attached to the one rotary plate are arranged to have a magnetic pole order of N, N, S, S, N, N, S, S, whilst a plurality of the other magnets arranged adjacent to each other and spaced at a predetermined interval onto the entire surface of the opposite inside of the yoke attached to the other rotary plate are arranged to have a magnetic pole order of S, S, N, N, S, S, N, N, so as to form the magnetic pole pairs, thereby forming a magnetic field having an interactively enhanced magnetically agglomerating and treating capacity for further rising the efficiency of removing the impurity.

BRIEF DESCRIPTIONS OF THE DRAWINGS

A preferred embodiment of the present invention will be described in detail with reference to the accompanying drawings

BEST MODES FOR CARRYING OUT THE INVENTION

As a preferred embodiment of the apparatus for magnetically agglomerating and treating impurities in liquids according to the invention, there will be described an apparatus for treating an oily waste electrical discharge machining liquor containing magnetic suspensions (steel powders) and non-magnetic suspensions (carbon powders) as impurities which are discharged from machine tools.

Figure 2:
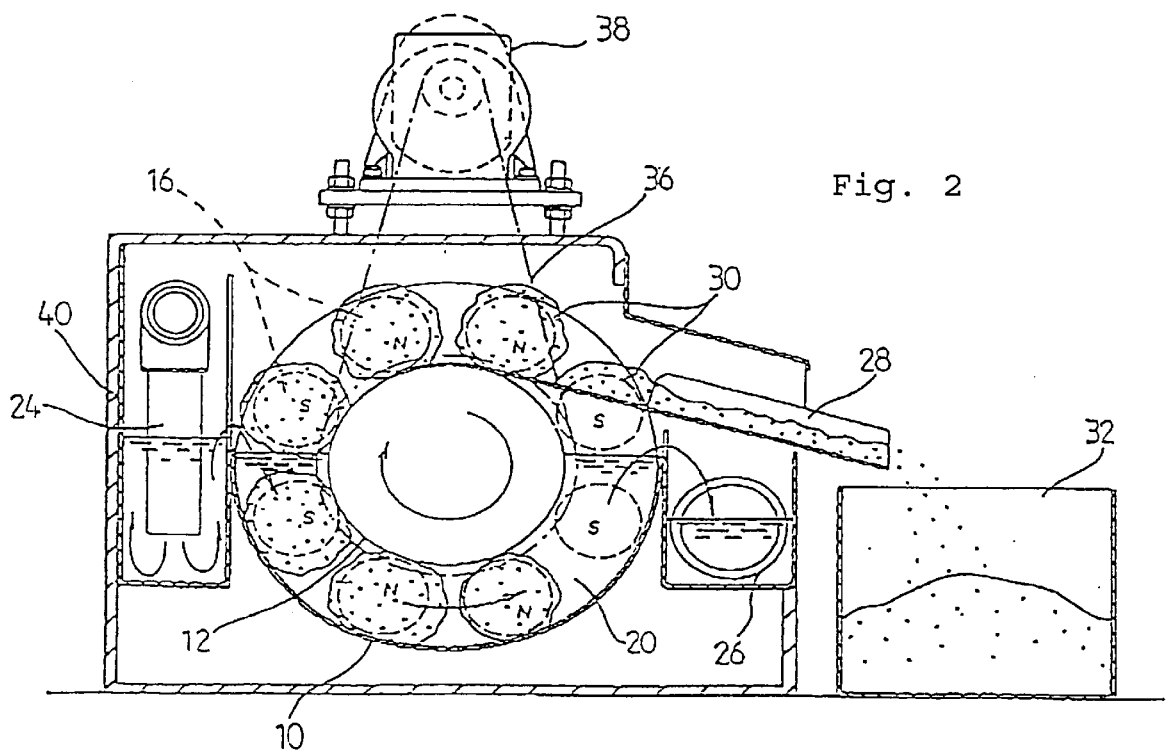
FIG. 2 is a schematic cross-sectional side view of the main part of the apparatus for magnetically agglomerating and treating impurities in liquids according to an embodiment of the present invention.
Figure 3:
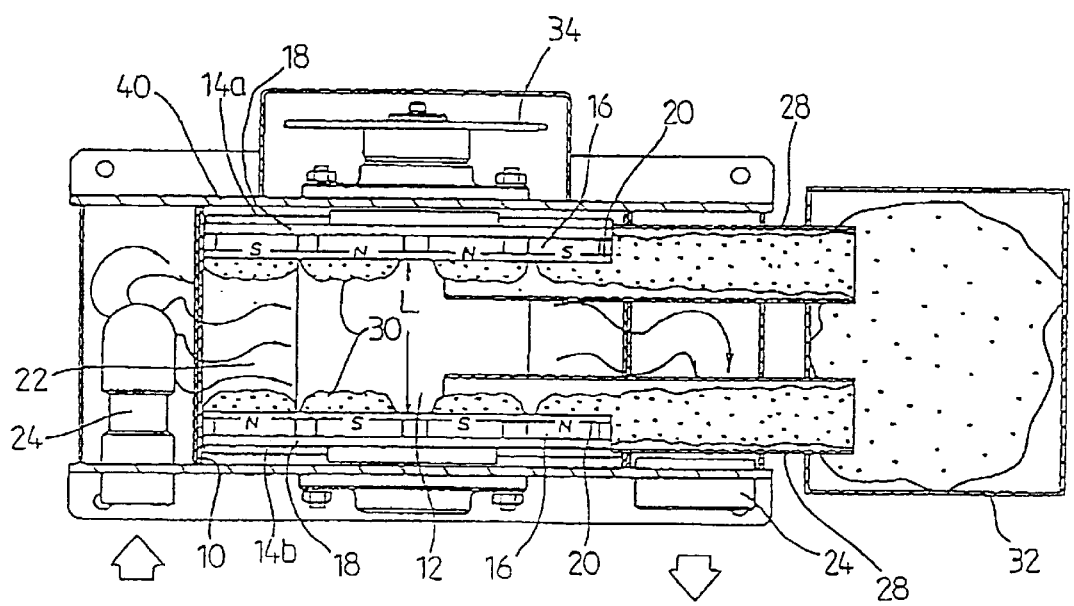
FIG. 3 is a fragmentary schematic cross-sectional plain view of the apparatus for magnetically agglomerating and treating impurities in liquids shown in FIG. 2.

In FIGS. 2 and 3, the apparatus for magnetically agglomerating and treating impurities in liquids according to the invention has rotary plates 14a, 14b fixed to opposite ends of a rotary shaft 12 provided in a magnetically agglomerating and treating tank 10, and magnets 16 attached on confronting insides of the two rotary plates 14a, 14b. In this case, the individual confronting insides of the two rotating plates 14a, 14b are attached to the individual confronting insides of a U-shaped yoke 18. A plurality of disk-like magnets 16 having a magnetic force of not less than 4000 gausses. preferably not less than 12000 gausses are arranged adjacent to each other at a predetermined interval on the sides of the U-shaped yoke 18. A non-magnetic adhesive plate 20 may, if necessary, be mounted on the magnets to sandwich the magnets 16 between each of the rotary plates 14a and 14b and the adhesive plate 20.

As the magnets 16 to be used in the present invention, there are useful permanent magnets such as a ferrite magnet having a magnetic force of not less than 4000 gausses, and preferably rare earth magnets having a magnetic force of not less than 12000 gausses. Particularly, samarium-cobalt based rare earth magnets or neodymium-iron-boron based rare earth magnets are preferable. Anisotropic neodymium-iron-boron based rare earth magnets having a magnetic force of not less than 12000 gausses are optimum. Further, as the magnets 16, electromagnets may, in some cases, be suitable instead of use of the above-mentioned permanent magnets.

Figure 1:
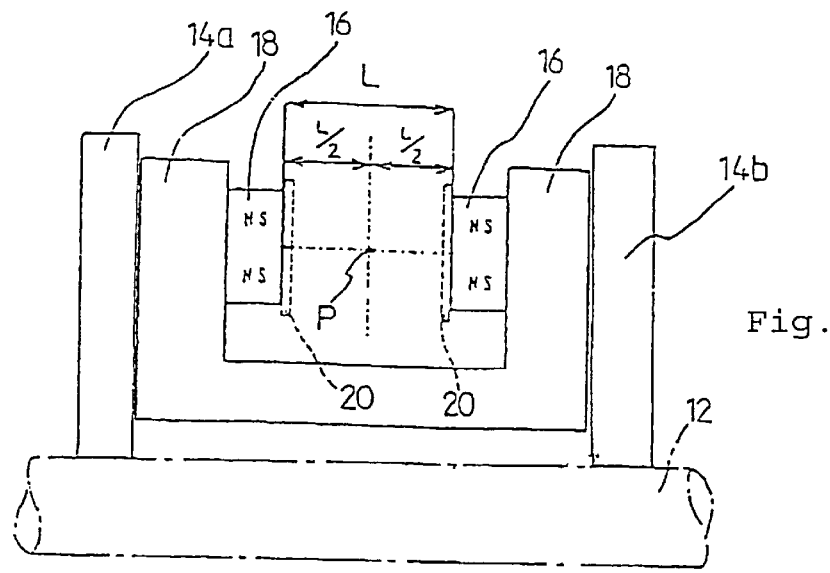
FIG. 1 is a view showing operational principles of the apparatus for magnetically agglomerating and treating impurities in liquids according to the present invention.

As to the shape of the magnet 16, polygonal shapes such as tetragon are available instead of the disk-shape. The proper size is in the range of 1 to 100 cm$^2$. The proper thickness is in the range of 0.5 to 15 cm. The proper number in use is 4 to 300 which are arranged at an interval of 0.1 cm to 5 cm A plurality of the magnets 16 are attached on the sides of the U-shaped yoke 18 so that, as illustrated in FIGS. 2 and 3, they are arranged adjacent to each other and on the confronting insides of the U-shaped yoke 18 provided onto the rotary plates 14a, 14b, so as to have a predetermined interval in the form of a merry-go-round fashion. Further, as illustrated in FIG. 1, a distance L between the confronting faces of the magnets 16 provided on the sides of the U-shaped yoke 18 is maintained in the range of L=3 to 200 mm to produce a magnetic field 22 for magnetic agglomeration treatment of the impurities in the waste liquor.

For forming the magnetic field 22, the magnetic poles of the plural magnets 16 attached on the sides of the U-shaped yoke 18 may be in the form of (1) random arrangements of S pole and N pole or (2) alternating arrangement of N pole and S pole such as in the order of N, S, N, S, however, (3) the magnetic pole order of N, N, S, S, N, N, S, S enables to increase the magnetically agglomerating and treating capability up to about two times higher than the arrangements of the above (1) or (2).

If the plural magnets 16 attached onto the yoke 18 provided on the one rotary plate 14a and the other magnets 16 attached onto the yoke 18 provided on the one rotary plate 14b are arranged to form such opposite magnetic poles that the magnetic pole of all the magnets 16 on one side is N pole whilst the magnetic pole of the other magnets 16 on the other side is S pole, thereby to increase the magnetically agglomerating and treating capability up to about three times higher than the arrangements of (1) or (2).

If the plural magnets 16 attached onto the yoke 18 provided on the one rotary plate 14a are arranged in the form of magnetic pole orders of N, N, S, S, N, N, S, S whilst the other magnets 16 attached onto the yoke 18 provided on the other rotary plate 14b are arranged in the form of the magnetic pole orders of S, S, N, N, S, S, N, N, so as to form alternating opposite magnetic poles, thereby to increase the magnetically agglomerating and treating capability up to about six times higher than the arrangements of (1) or (2).

In the invention, the inlet of the magnetically agglomerating and treating tank 10 is connected to an inlet pipe 24 for introducing a waste electrical discharge machining liquor which is discharged from machine tools, and contains magnetic suspensions and non-magnetic suspensions. The outlet of the magnetically agglomerating and treating tank 10 is connected to an outlet pipe 26 for discharging a coolant liquor (treated liquid) from which impurities have been removed by the magnetically agglomerating and treating processes. A scraper 28 is also provided adjacent to the rotary adhesive plate 20 to scrape magnetic agglomerates 30 adhered to the adhesive plate 20 from the plate, and a discharge tank 32 is arranged adjacent to the scraper 28 to discharge the magnetic agglomerates 30 scraped off by the scraper 28.

A sprocket 34 of the rotary shaft 12, to which the rotary plates 14a, 14b are fixed, is connected to a motor 38 via a chain 36. By rotating the two rotating plates 14a, 14b, the plural magnets 16 mounted thereon are also rotated. The rates of rotations of the two rotary plates 14a, 14b arc preferably rotated at a rate of 0.1 to 50 turns per minute.

The flow rate of the waste liquor containing impurities to be magnetically agglomerated and treated is not less than 0.01 m/sec preferably in the range of 0.01 to 0.1 m/sec. If the flow rate is less than 0.01 m/sec, the efficiency is too low as practical, even no trouble with respect to the magnetic agglomeration process. If the flow rate is beyond 0.1 m/sec, the flow rate of the waste liquor might be too high to effect the magnetic agglomeration process.

When the magnetic agglomeration process is carried out by usirrg the magnets 16 having a magnetic force of 4000 gausses, a contact time between the impurity-containing waste liquor and the magnets 16 is set in the range of 0.1 to 180 minutes. In this case, if the contact time is less than 0.1 minute, then a predetermined magnetic agglomeration treatment effect cannot be expected. If the contact time is beyond 180 minutes, then there is no longer merit.

When the magnetic agglomeration process is carried out by using the magnets 16 having a magnetic force of 12000 gausses, then a contact time between the impurity-containing waste liquor and the magnets 16 is set at not more than 60 minutes, for example, in the range of 0.05–60 minutes. If the contact time is mot more than 0.05 minute, then a predetermined magnetic agglomeration treatment effect might not be expected. If the contact time beyond 60 minutes, then there is no longer merit.

The magnets 16 and 16, each of which has magnetic forces of 4000 gausses or 12000 gausses respectively are disposed on the confronting sides of the U-shaped yoke 18 in the form of opposite poles as shown in FIGS. 2 and 3, and also a distance L between the confronting faces of the magnets 16 and 16 is set in the range of from 3 to 300 mm as shown in FIG. 1. The magnetic flux density H was measured at the center point P of the distance L, and the results shown in Table 1 were obtained.

TABLE 1

| distance between magnets (L) | magnetic flux density of magnet (H) | |
|---|---|---|
| | magnet with 4000 gausses | magnet with 12000 gausses |
| 3 mm | 3750.5 gausses | 11251.4 gausses |
| 6 mm | 3503.9 gausses | 10511.6 gausses |
| 12 mm | 3029.8 gausses | 9089.5 gausses |
| 25 mm | 2212.2 gausses | 6633.6 gausses |
| 50 mm | 1171.6 gausses | 3514.8 gausses |
| 100 mm | 422.0 gausses | 1266.0 gausses |
| 200 mm | 119.6 gausses | 358.8 gausses |
| 300 mm | 53.0 gausses | 158.0 gausses |

As described above, if the distance L between the confronting faces of the magnets 16 and 16 is set in the range of 3 to 200 mm, then the magnetic flux density H is not less than 100 gausses. If the distance L is not less than 200 mm, then the magnetic flux density H is not higher than 100 gausses. For example, if the distance L is set to 300 mm, the magnetic flux density H is 53.0 gausses. It is difficult to obtain a sufficient magnetic flux for magnetically agglomerating almost all of the non-magnetic suspensions in the waste liquor to be described below. If the distance is less than 3 mm, the distance between the magnets 16 and 16 is too narrow to form a space for providing the scraper 28 to remove magnetically adsorbed suspensions between the magnets 16 and 16, even no problem with regard to the magnetic flux density. Therefore, the preferable range in distance between the magnets 16 and 16 is 6–100 mm.

As having been well known, magnetic materials such as iron, nickel and cobalt adhere to the magnets 16. One of the reasons why is that these magnetic materials have unpaired electrons in view of atomic structure. By contrast, non-magnetic materials have no unpaired electrons in view of atomic structure and thus do not adhere to the magnets 16.

The following has been found. The distance L between the confronting faces of the magnets 16 and 16 is set in the preferable range of 3 to 200 mm, for flowing the non-magnetic suspension containing waste liquor through a magnetic field 22 having a magnetic flux density H of not less than 100 gausses, preferably not less than 3000 gausses, whereby one of the paired electrons of the non-magnetic suspensions in the waste liquor is released to produce unpaired electrons or magnetic material which could be magnetically agglomerated.

Subsequently, operations and running of the system for magnetic agglomeration process according to the present invention will be described below. The impurity containing waste liquor containing magnetic suspensions and non-magnetic suspensions having been discharged from machine tools is discharged from the electrical discharge machine to flow the same through the inlet pipe 24 into the magnetically agglomerating and treating tank 10 at the predetermined flow rate as described above, and concurrently, a motor 38 provided on a mount 40 of the magnetically agglomerating and processing system is driven to rotate the sprocket 34 of the rotary shaft 12 via the chain so as to rotate the rotary plates 14a, 14b with the plural magnets 16 in the clockwise direction.

The electrical discharge machining waste liquor introduced into the magnetically agglomerating and processing tank 10 is then flowed through the plural confronting magnets 16 attached on the two rotary plates 14a, 14b in the anti-clockwise direction. In the magnetic field 22 having a high magnetic flux density of not less than 100 gausses preferably not less than 3000 gausses, the non-magnetic suspensions in the waste liquor are converted to magnetic materials having unpaired electrons, resulting in magnetic agglomeration together with the magnetic suspensions and magnetic adsorption onto the surfaces of the adhesive plates 20 on the magnets 16 as magnetic agglomerates 30.

The treated liquor from which the magnetic suspensions and the non-magnetic suspensions have been removed as the magnetic agglomerates 30 is then recycled via the outlet pipe 26 of the magnetically agglomerating and treating tank 10 as an electrical discharge machining liquid. The magnetic agglomerates 30 magnetically adsorbed onto the surfaces of the adhesive plates 20 on the magnets 16 are rotated in the clockwise direction together with the two rotary plates 14a, 14b so as to be scraped by the scraper 28 from the surfaces of the adhesive plates 20, before the scraped magnetic agglomerates 30 are then transferred along the scraper 28 and discharged into a waste storage tank 32.

EXAMPLE

As illustrated in FIGS. 2 and 3, preparations were made for two sets of magnetically agglomerating and treating tanks (500 cc) according to the present invention, wherein magnets (50×40×15 cm) of rare earth elements having magnetic forces of 4000 gausses and 12000 gausses respectively were mounted at a distance between the confronting faces of 6 mm and 12 mm respectively on the opposite sides of the U-shaped yoke 18 fixed to the two rotary plates 14a, 14b in the form of opposite poles. Also, as a comparative example, preparation was made for a single set of a magnetically agglomerating and treating tank (500 cc), wherein the distance between the confronting surfaces of the magnets was set at 300 mm.

Into each of the magnetically agglomerating and treating tanks, there is introduced 300 cc of an electrical discharge machining aqueous waste liquor containing 6667 ppm of impurities of steel powders (33%) as a magnetic suspension and carbon powders (96.7%) as a non-magnetic suspension, so that the magnetic agglomeration process was carried out under the following conditions (see Table 2). The results of measuring the concentration of the residual suspensions are shown in Table 2.

TABLE 2

Amount of impurities in magnetically agglomerated and treated liquor

| process conditions | Apparatus A according to the invention | Apparatus B according to the invention | Apparatus comparative example |
|---|---|---|---|
| magnetic force of magnet(gauss) | 12000 | 4000 | 12000 |
| distance between magnet faces (mm) | 6 | 12 | 300 |
| flow rate of waste liquor (m/sec) | 0.01 | 0.01 | 0.01 |
| contact time of waste liquor (min.) | 180 | 60 | 180 |
| magnetic flux density of magnet (gauss) | 10500 | 3030 | 158 |
| amount of impurities in treated liquor | | | |
| magnetic suspension (ppm) | 3 | 28 | 2650 |
| non-magnetic suspension (ppm) | 130 | 1987 | 6356 |

As being apparent from the above-mentioned example, according to the apparatus of the present invention, it is possible to magnetically agglomerate the non-magnetic suspensions deteriorating the quality of the liquid together with the magnetic suspensions and to remove the same from the liquid without discontinuation of the removal process.

Further, in accordance with the apparatus of the present invention, it is also possible to reduce the initial and running costs of removal process to impurities such as suspensions from the liquid since it is unnecessary to exchange filter papers or filter cloths or to wash a strainer or the like every time.

Furthermore, in accordance with the apparatus of the present invention, it is advantageous that the impurities requiring costly disposal, for example, the used electrical discharge machining waste liquors and the used coolant waste liquors are removable to allow recycling the electrical discharge machining liquors and the coolant liquors. This is just suitable for the current requirements for recycling resources.

Since, in accordance with the apparatus of the present invention, the impurities such as suspensions in liquids are separable as a scale, (1) it is possible to largely reduce the amount of the wastes, and (2) it is possible to curtail the disposal cost without taking disposal space, and (3) it is possible to keep good working environments without corruption of the wastes and generation of malodors.

I claim:

1. An apparatus for magnetically agglomerating and treating impurities in liquids which is characterized in that magnets (16, 16) are attached at a predetermined interval (L) on inside confronting faces of a U-shaped yoke (18) and further rotary plates (14a, 14b) are fixed to opposite outside faces of the yoke;

the rotary plates (14a, 14b) are fixed to opposite ends of a rotary shaft (12) provided in a magnetically agglomerating and treating tank (10) which is in communication with a stock solution inlet pipe (24) and a treated liquid outlet pipe (26);

the distance (L) between the confronting magnets (16, 16) is set at 300 mm to form a magnetic field of a magnetic flux density of not less than 3000 gausses for flowing a liquid containing impurities such as magnetic suspensions and non-magnetic suspensions through the magnetic field at a flow rate of not less than 0.01 m/sec and concurrently making the liquid into contact with the magnets (16, 16) for not more than 60 minutes, so as to release one of the paired electrons of the non-magnetic suspension in the liquid, thereby to produce unpaired electrons for magnetic agglomerating together with the magnetic suspensions;

adhesive plates (20, 20) are provided on the inside faces of the confronting magnets for magnetic adsorption by the magnets (16, 16); and scrapers (28, 28) are provided for continuously scraping the magnetic agglomeration on the surfaces of the adhesive plates (20, 20), wherein the magnets (16, 16) having a magnetic force of not less than 12000 gausses are attached to increase the efficiency of removing the impurities.

2. The apparatus for magnetically agglomerating the treating impurities in liquids according to claim 1, wherein the magnets (16, 16) having a magnetic force of not less than 12000 gausses are attached increase the efficiency of removing the impurities.

3. The apparatus for magnetically agglomerating and treating impurities in liquids according to claim 1, wherein the magnets (16, 16) arranged adjacent to each other and at a predetermined interval on the entire surface of the inside of the yoke attached to the side of the one rotary plate (14a) and the magnets (16, 16) arranged adjacent to each other and at a predetermined interval on the entire surface of the inside of the yoke attached to the side of the other rotary plate (14b) are so arranged to form magnetic pole pairs for forming a magnetic field having an interactively enhanced magnetically agglomerating and treating capacity thereby to further increase the efficiency of removing the impurities.

4. The apparatus for magnetically agglomerating and treating impurities in liquids according to claim 1, wherein the magnets (16, 16) arranged adjacent to each other and at a predetermined interval on the entire surface of the inside of the yoke attached to the side of the one rotary plate (14a) and the magnets (16, 16) arranged adjacent to each other and at a predetermined interval on the entire surface of the inside of the yoke attached to the side of the other rotary plate (14b) are so arranged to form magnetic pole pairs for forming a magnetic field having an interactively enhanced magnetically agglomerating and treating capacity thereby to further increase the efficiency of removing the impurities.

5. The apparatus for magnetically agglomerating and treating impurities in liquids according to claim 4, wherein a plurality of the magnets (16, 16) arranged adjacent to each other and at a predetermined interval onto the entire surface of the inside of the yoke (18) attached to the one rotary plate (14a) are arranged to have a magnetic pole order of N, N, S, S, N, N, S, S, whilst a plurality of the other magnets (16, 16) arranged adjacent to each other and at a predetermined interval onto the entire surface of the confronting inside of the yoke (18) attached to the other rotary plate (14b) are arranged to have a magnetic pole order of S, S, N, N, S, S, N, N, so as to form the magentic pole pairs, thereby forming a magnetic field having an interactively enhanced magnetically agglomerating and treating capacity for further increasing the efficiency of removing the impurity.

6. The apparatus of claim 1 wherein the magnetic field is set at a flow rate in the range of 0.01–0.1 m/sec.

7. The apparatus of claim 1 wherein the apparatus is adapted to concurrently contact the liquid and the magnets for a time within the range of 0.05–60 minutes.

* * * * *